(12) United States Patent
Murphy et al.

(10) Patent No.: US 9,971,509 B2
(45) Date of Patent: *May 15, 2018

(54) SYSTEM AND METHOD FOR MANAGING SPACE ALLOCATION WITHIN A FILE SYSTEM

(71) Applicant: Dell Products, LP, Round Rock, TX (US)

(72) Inventors: Timothy T. Murphy, Austin, TX (US); Suneet Chandok, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/746,086

(22) Filed: Jun. 22, 2015

(65) Prior Publication Data

US 2015/0293706 A1 Oct. 15, 2015

Related U.S. Application Data

(62) Division of application No. 13/089,711, filed on Apr. 19, 2011, now Pat. No. 9,063,847.

(51) Int. Cl.
*G06F 12/02* (2006.01)
*G06F 3/06* (2006.01)
*G06F 17/30* (2006.01)

(52) U.S. Cl.
CPC .......... *G06F 3/0607* (2013.01); *G06F 3/067* (2013.01); *G06F 3/0644* (2013.01); *G06F 12/0253* (2013.01); *G06F 12/0284* (2013.01); *G06F 17/30138* (2013.01); *G06F 2212/1044* (2013.01); *G06F 2212/702* (2013.01)

(58) Field of Classification Search
None
See application file for complete search history.

(56) References Cited

U.S. PATENT DOCUMENTS

| 6,591,334 B1* | 7/2003 | Shyam ................. G06F 3/0614 711/112 |
| 2007/0022133 A1* | 1/2007 | Barghouthi ....... G06F 17/30289 |
| 2007/0186083 A1 | 8/2007 | Lambert et al. |
| 2008/0172427 A1 | 7/2008 | Ito |
| 2009/0106844 A1 | 4/2009 | Yoon et al. |

(Continued)

*Primary Examiner* — Charles Rones
*Assistant Examiner* — Ryan Dare
(74) *Attorney, Agent, or Firm* — Larson Newman, LLP (57) ABSTRACT

A chassis management controller includes a root file system, a shared memory, a daemon process module, and an interposer library. The root file system includes a plurality of directories associated with firmware applications of the chassis management controller. The daemon process module is configured to read the parameters of the directories, and to create, in the shared memory, a table including parameters of the directories. The interposer library is configured to intercept an input/output library call for an operation associated with one of the firmware applications, to read table entries associated the one or the firmware applications, to determine whether the operation associated with the input/ output library call would result in an over-allocation of a parameter in the entries of the table, and if the operation would not result in the over-allocation, pass the output operation to a standard system library, otherwise to return an out of space error message.

19 Claims, 6 Drawing Sheets

(56) References Cited

U.S. PATENT DOCUMENTS

| | | |
|---|---|---|
| 2009/0164539 A1 | 6/2009 | Pudipeddi et al. |
| 2010/0049776 A1 | 2/2010 | Patel et al. |
| 2010/0138589 A1 | 6/2010 | Munegowda et al. |
| 2010/0146592 A1 | 6/2010 | Gamare et al. |
| 2010/0287346 A1 | 11/2010 | Schreter |
| 2011/0179194 A1* | 7/2011 | De Atley .............. G06F 9/4413 710/13 |
| 2012/0272033 A1 | 10/2012 | Murphy et al. |

* cited by examiner

| Directory Name | Single File Size | Space Allocation | Current Size |
|---|---|---|---|
| Chassis Config. Profile | 70 B | 3.4 MB | 3.35 MB |
| Blade Profile | 50 B | 2.2 MB | 1.5 MB |
| Firmware Upgrade | 1.3 MB | 2.0 MB | 0 B |
| ⋮ | ⋮ | ⋮ | ⋮ |

SYSTEM AND METHOD FOR MANAGING SPACE ALLOCATION WITHIN A FILE SYSTEM

CROSS REFERENCE TO RELATED APPLICATIONS

This application is a divisional of U.S. patent application Ser. No. 13/089,711, entitled "System and Method for Managing Space Allocation within a File System," filed on Apr. 19, 2011, the disclosure of which is hereby expressly incorporated by reference in its entirety.

FIELD OF THE DISCLOSURE

This disclosure generally relates to information handling systems, and more particularly relates to a system and method for managing space allocation within a file system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system can include a chassis management controller (CMC) for setting up and controlling profile configurations for the entire information handling system, a single server in the information handling system, and the like. The CMC can include a root file system that may include directories for storing data for different applications associated with the information handling system. Different applications of the CMC can read and write different files to specific directories of the root file system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
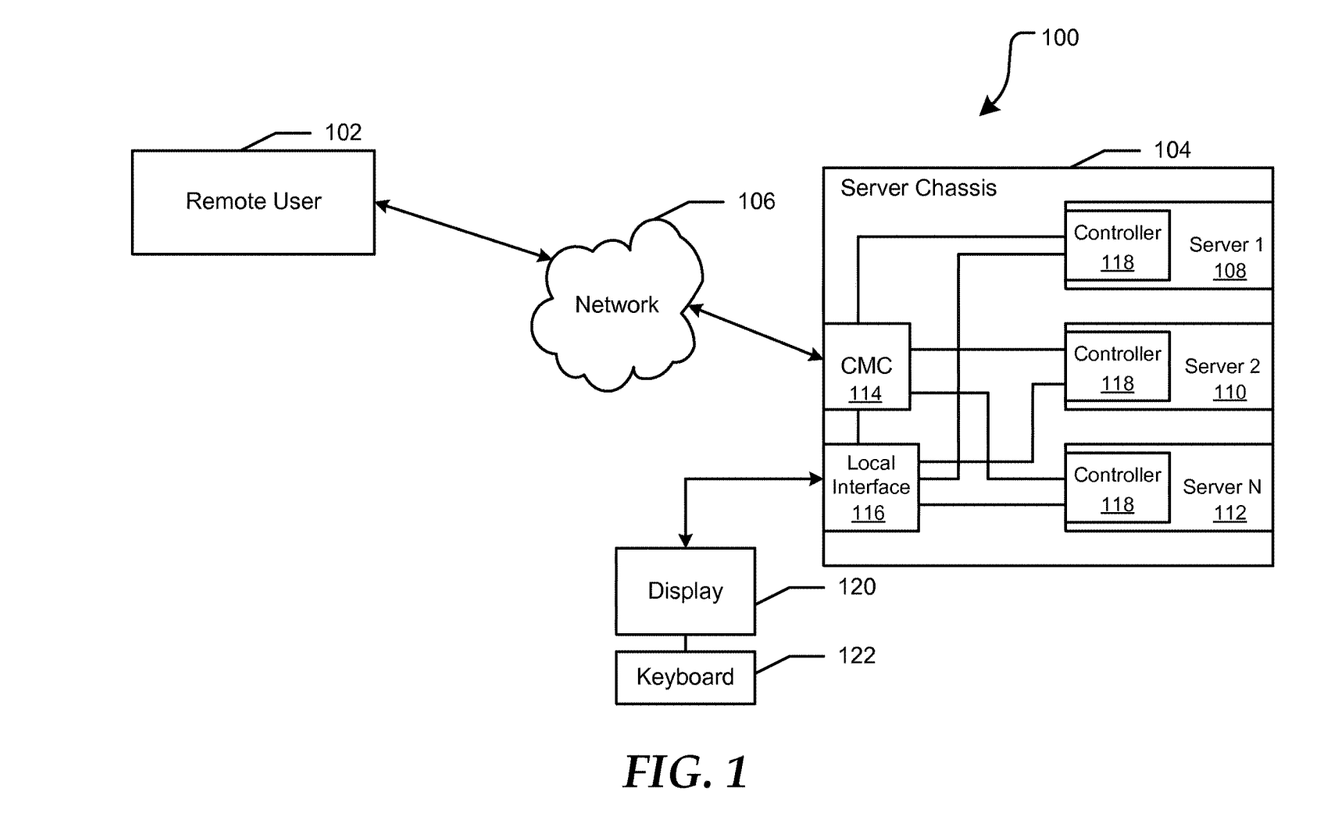
FIG. 1 is a block diagram of a blade server chassis system.

FIG. 1 shows a blade server chassis system 100 of information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Remote user 102 can communicate with a server chassis 104 via a network 106. The server chassis 104 includes servers 108, 110, and 112, a chassis management controller (CMC) 114, and a local interface card 116. Each of the servers 108, 110, and 112 can include a controller 118. The remote user 102 can communicate with the controller 118 of each of the servers 108, 110, and 112, and with the CMC 114 via the network 106. The CMC 114 is in communication with the local interface card 116, and with the controller 118 of each of the servers 108, 110, and 112. The local interface card 116 is in communication with the controller 118 of each of the servers 108, 110, and 112, with a local display 120, and with a local keyboard 122.

The local interface card 116 can be an integrated keyboard, video, and mouse (iKVM) interface card that can provide a local user with access to each of the servers 108, 110, and 112. Each of the controllers 118 can be any type of controller, such as an integrated Dell Remote Access Controller (iDRAC), which is an interface card that can provide out-of-band management of the servers 108, 110, or 112. The controllers 118 can each have a processor, a memory, a battery, a network connection, and access to a server chassis bus. The controller 118 can provide different functions for the server 108, 110, or 112 such as power management, virtual media access, and remote console capabilities. The power management, the virtual media access, and the remote console capabilities can all be available through a graphical user interface (GUI) on a web browser of the remote user 102, 104, or 106. Thus, the remote user 102 can configure the servers 108, 110, and 112 of the server chassis 104 as if the remote user was at the local console.

The remote user 102 can be a remote iDRAC user, such that the remote user can utilize a remote access controller GUI to log on to or connect with the controller 118 of each of the servers 108, 110, and 112 to configure each individual server. The remote user 102 can be a remote CMC user, such that the remote user can utilize a CMC GUI to log on to or connect with the CMC 114 to control and configure the servers 108, 110, and 112. The remote user 102 can be a remote virtual KVM (vKVM) user, such that the remote user can utilize a vKVM GUI to log on to or connect with the local interface card 116 to control and configure the servers 108, 110, and 112. A local user can utilize the local interface card 116, the local display 120, and the keyboard 122 to access one of the servers 108, 110, and 112, and the CMC 114. The local user can select a desired server 108, 110, or 112, and can then access or configure the server.

If a user, such as the remote user 102 or a user at the keyboard 122, needs to perform an operation on the server 108, the user can access the CMC 114 via the network 106 or the local interface card 116. Different types of operations that can include a firmware upgrade, a basic input/output system (BIOS) update, installing an operating system, configuring a server, configuring the server chassis, and the like. The different application operations can store data within directories of a root file system in a memory of the CMC 114. Before the operation is performed, the CMC 114 can determine whether data associated with the operation can be saved to a desired directory without exceeding parameters of the directory. If the operation will not exceed one of the parameters, the CMC 114 can allow the operation to be performed by an application.

Figure 2:
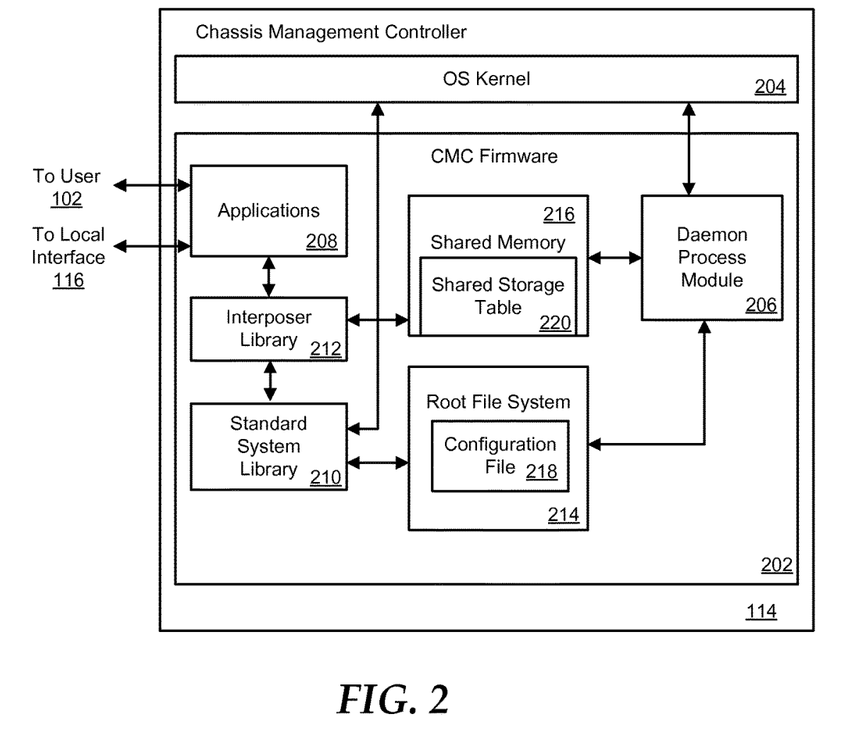
FIG. 2 is a block diagram of a chassis management controller of the blade server chassis system.

FIG. 2 shows the CMC 114, which includes CMC firmware 202 and an operating system (OS) kernel 204. The CMC firmware includes a daemon process module 206, and multiple applications 208 that each are layered with a standard system library 210 and an interposer library 212. The CMC firmware 202 can also include a root file system 214 and a shared memory 216. The root file system can store a configuration file 218, and the shared memory 216 can include a shared storage table 220. The shared memory 216 can be a secure digital (SD) memory card that has a limited amount of storage capacity. The daemon process module 206 can execute a daemon process in the CMC firmware 202.

The OS kernel 204 communicates with the standard system library 210 of the applications 208, and with the daemon process module 206. The daemon process module 206 communicates with the configuration file 218 of the root file system 214, and with the shared storage table 220 of the shared memory 216. The applications 208 can communicate with the remote user 102, and the local interface card 116 of FIG. 1. The interposer library 212 communicates with configuration file 218 of the root file system 214, and with the shared storage table 220 of the shared memory 216.

During operation, the daemon process module 206 can read the configuration file 218 in the root file system 214, and can parse the configuration file to determine parameters for the firmware features or applications 208. The parameters for the firmware applications 208 can include a directory name, a maximum size of a single file that can be stored in the directory, a total shared memory space allocation, and the like. The total shared memory space allocation can indicate an amount of storage space in the shared memory 216 allocated to the application 208. Thus, the storage space allocated to each directory in the configuration file 218 can be limited so that one application does not use all of the storage capacity of the shared memory 216. The directory name can be the location within the root file system 214 of the CMC firmware 202 where the files and data associated with the application 208 are stored. In an embodiment, the maximum size of a single file cannot exceed the total shared memory space allocation.

Figure 3:
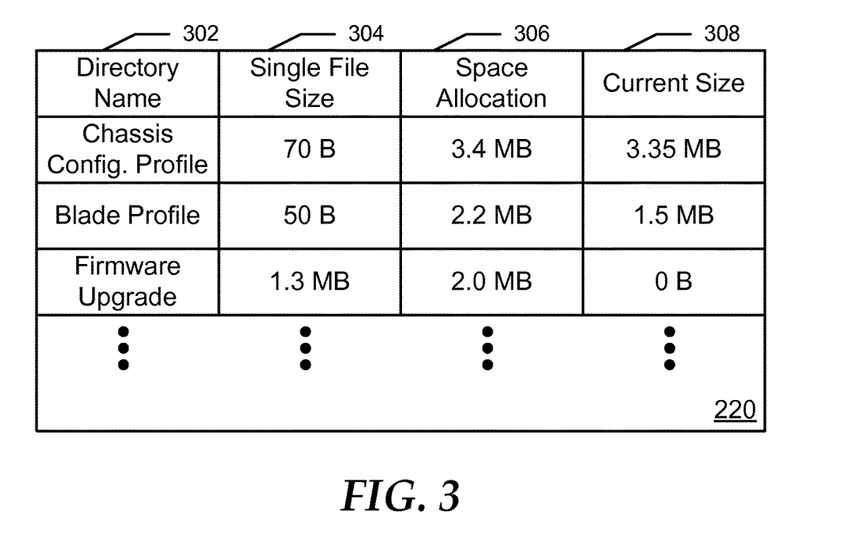
FIG. 3 is an exemplary table of parameters for applications of the chassis management controller.

When the configuration file 218 has been parsed, the daemon process module 206 can create the shared storage table 220 in the shared memory 216 using the parameters of the firmware applications 208 found in the configuration file. The shared storage table 220 can include an entry column 302 for the directory name, an entry column 304 for the maximum size of a single file for the directory, and an entry column 306 for the maximum shared memory space allocation for each application 208 as shown in FIG. 3.

The daemon process module 206 can also add an entry column 308 for a current size of each directory associated with each of the applications 208. For example, the entry column 302 for the directory name can be the chassis configuration profile, the blade profile, firmware upgrade, and the like. The entry column 304 for the maximum size of a single file can include 70 Bytes (B) for the chassis configuration profile, 50 B for the blade profile, 1.3 Mega Bytes (MB) for firmware upgrade, and the like. The entry column 306 for the total space allocation can include 3.4 MB for the chassis configuration profile, 2.2 MB for the blade profile, 12.0 MB for firmware upgrade, and the like. The entry column 308 for the current size can include 3.35 MB for the chassis configuration profile, 1.5 MB for the blade profile, 0 B for firmware upgrade, and the like.

Referring back to FIG. 2, when the shared storage table 220 has been completed, the daemon process module 206 can register with the OS kernel 204 to receive notifications when changes are made to any of the directories of the configuration file 218. The daemon process module 206 can then enter an idle mode, and wait for a notification from the OS kernel 204.

During an operation in the CMC 114, the standard system library 210 can receive an input/output (I/O) library call associated with the operation of the application 208. The operation can be requested by the remote user 102 or the keyboard 122 of the local interface card 116. The I/O library call can be a request to either write data to or read data from a directory in the configuration file 218 of the root file system 214. For example, the operation can be to store a firmware update file, modify a blade profile of server 108, 110, or 112, modify the chassis configuration profile, and the like. The interposer library 212 can intercept the I/O library call made to the standard system library 210, and the interposer library 212 can read entries in the shared storage table 220 to determine the parameters of application 208 associated with the I/O library call.

The interposer library 212 can determine whether the operation associated with the I/O library call would result in an over-allocation of a parameter in the shared memory table 220. The over-allocation can result if a file requested to be written to the directory is larger than the maximum size of a single file for that directory, if the file causes the maximum shared memory space allocation for that directory to be exceeded, or the like. The interposer library 212 can read the current values of the parameters in the shared storage table to determine whether an over-allocation of one of the parameters would result. For example, if the operation is to modify the chassis configuration profile, over-allocation can result if a file to be written to the directory of the configuration file 218 is more than the maximum size of a single file in entry column 304 for the chassis configuration profile of the shared storage table 220.

If the interposer library 212 determines that the operation would result in the over-allocation, an error message indicating that the directory is out of space is returned to the application 208. The error message can then be sent to the remote user 102 via the network 106, or to the display 120 via the local interface card 116. However, if the interposer library 212 determines that the operation would not result in the over-allocation, the I/O library call can be passed to the standard system library 210 to be performed.

When the operation associated with the I/O library call is performed the OS kernel 204 can write data to the directory of the configuration file 214 associated with the application 208 performing the operation. The OS kernel 204 can then send a notification to the daemon process module 206 indicating that a change has been made to a directory within the configuration file 218. The daemon process module 206 can exit the idle mode in response to receiving the notification, and can read the configuration file 218 to determine the change made in the configuration file. The change can be that a new file is written to the directory, that a file is deleted from the directory, that a file is modified to be either larger or smaller, and the like. The daemon process module 206 can then update the shared storage table 220 to reflect the change to the configuration file 218. If the change to the configuration file 218 is that a new firmware application 208 is assigned a directory in the configuration file, the daemon process module 206 can create new entries in the shared storage table 220 for the new firmware application.

Figure 4:
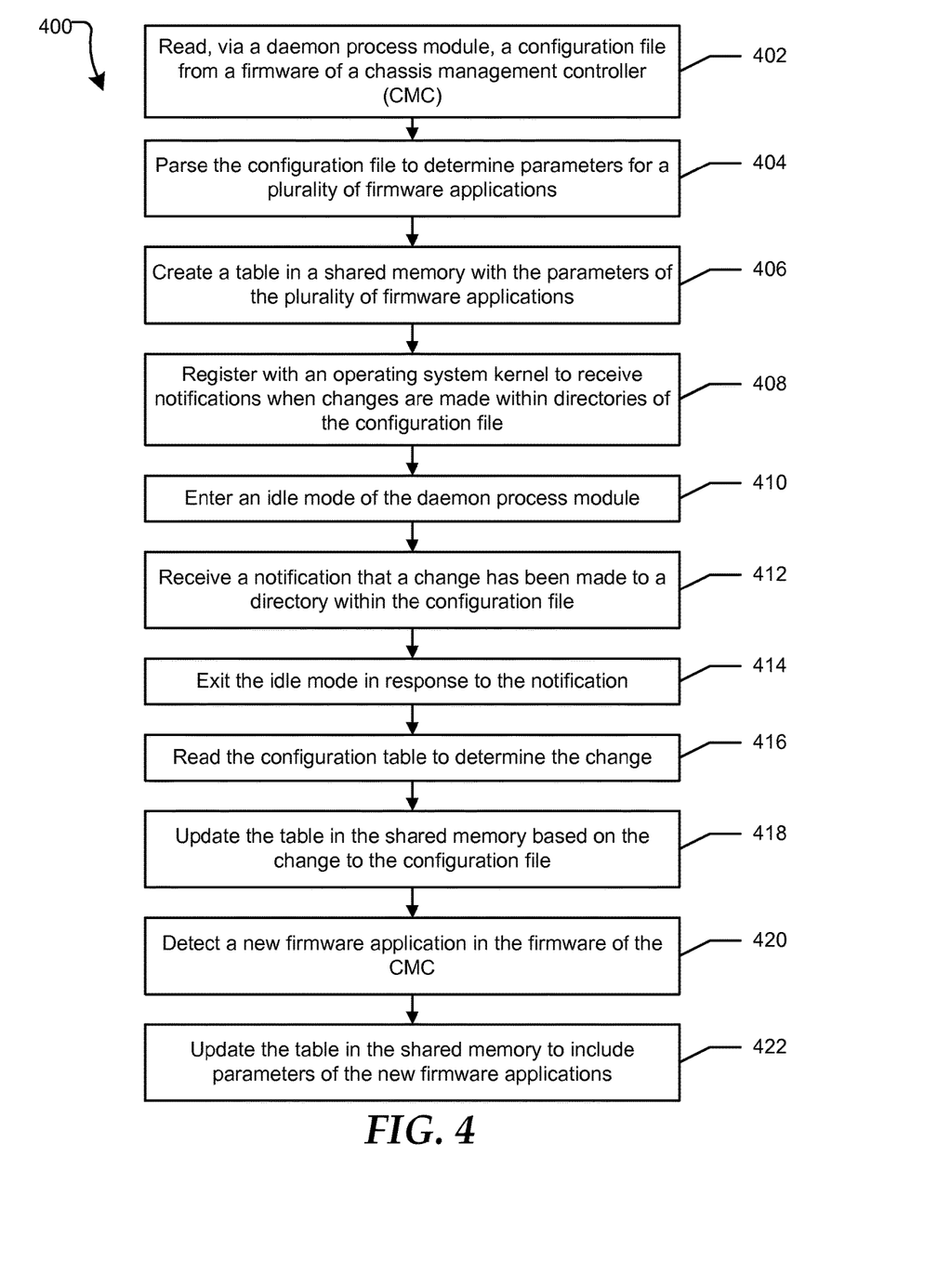
FIG. 4 is a flow diagram of a method for creating the table of parameters.

FIG. 4 is a flow diagram of a method 400 for creating a table of parameters for features of the CMC. At block 402, a configuration file is read, via a daemon process module, from firmware of the CMC. The configuration file is parsed to determine the parameters for a plurality of firmware applications or applications at block 404. The parameters for the application can include a directory name, a maximum size of a single file that can be stored in the directory, a total or maximum shared memory space allocation, and the like. The directory name can be the location within a root file system of the CMC firmware that the files associated with the feature can be stored. In an embodiment, the maximum size of a single file cannot exceed the total shared memory space allocation.

At block 406, table in a shared memory is created using the parameters of the plurality of firmware applications as entries in the table. The daemon process module registers with an OS kernel at block 408. The registration of the daemon process module with the OS kernel can enable the daemon process module to receive notifications when changes are made to one or more directories in the configuration file. At block 410, an idle mode of the daemon process module is entered. A notification is received that a change has been made to a directory with the configuration file at block 412.

At block 414, the idle mode is exited in response to the notification. The configuration file is read to determine the change in the directory at block 416. The change can be that a new file is written to the directory, that a file is deleted from the directory, that a file is modified to be either larger or smaller, and the like. At block 418, the table in the shared memory is updated based on the change to the configuration file. At block 420, a new firmware application is detected for the firmware of the CMC. The new firmware application can be assigned the parameters in the configuration file as stated above. The table in the shared memory is updated to include the parameters of the new firmware application at block 422.

Figure 5:
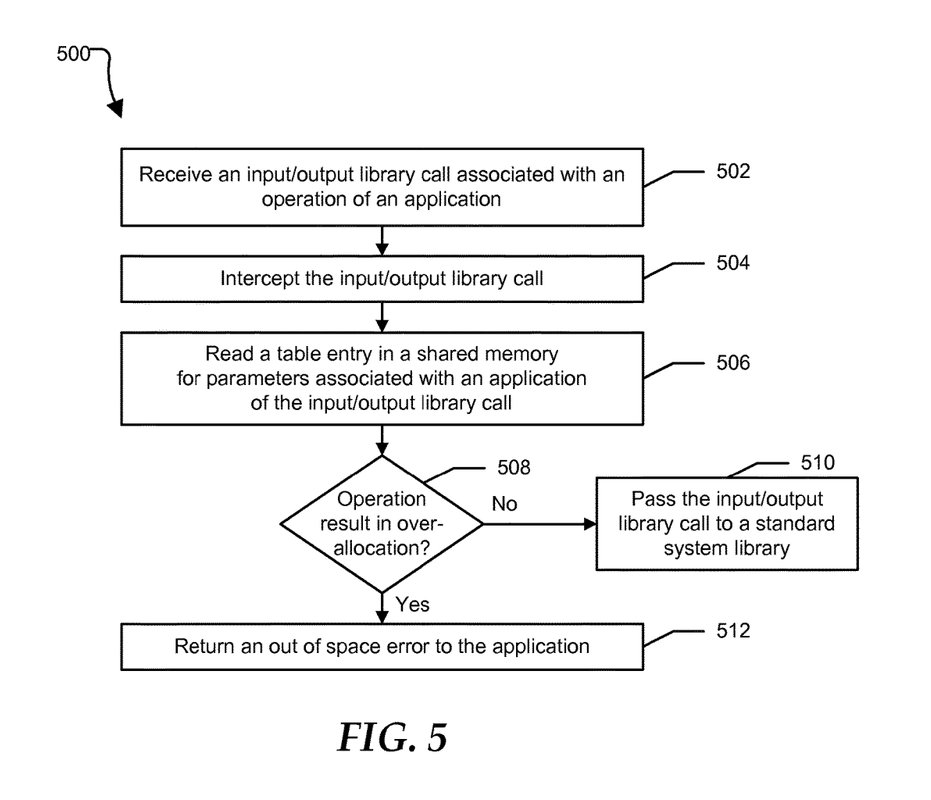
FIG. 5 is a flow diagram of a method for determining whether to allow an operation associated with an input/output call.

FIG. 5 is a flow diagram of a method 500 for determining whether to allow an input/output operation based on the table of parameters. At block 502, an input/output library call, to a standard system library, associated with an operation of an application is received. The input/output library call can be a request to either write to or read from a directory in a configuration file in root file system of CMC firmware. The input/output library call to the standard system library can be intercepted by an interposer library at block 504. At block 506, entries stored in a shared memory are read for parameters of an application associated with the input/output library call. The parameters for the application can include a directory name, a maximum size of a single file that can be stored in the directory, a total shared memory space allocation, and the like.

At block 508, a determination is made whether an operation of the application associated with the input/output library call would result in an over-allocation of a parameter found the table. The over-allocation can be that file requested to be written to the directory is larger than the maximum size of a single file for that directory, that the file could cause the maximum shared memory space allocation for that directory to be exceeded, or the like. If the operation would not result in the over-allocation, the input/output library call is passed to the standard system library at block 510. If the operation would result in the over-allocation, an error message indicating that the directory is out of space is returned to the application at block 512.

Figure 6:
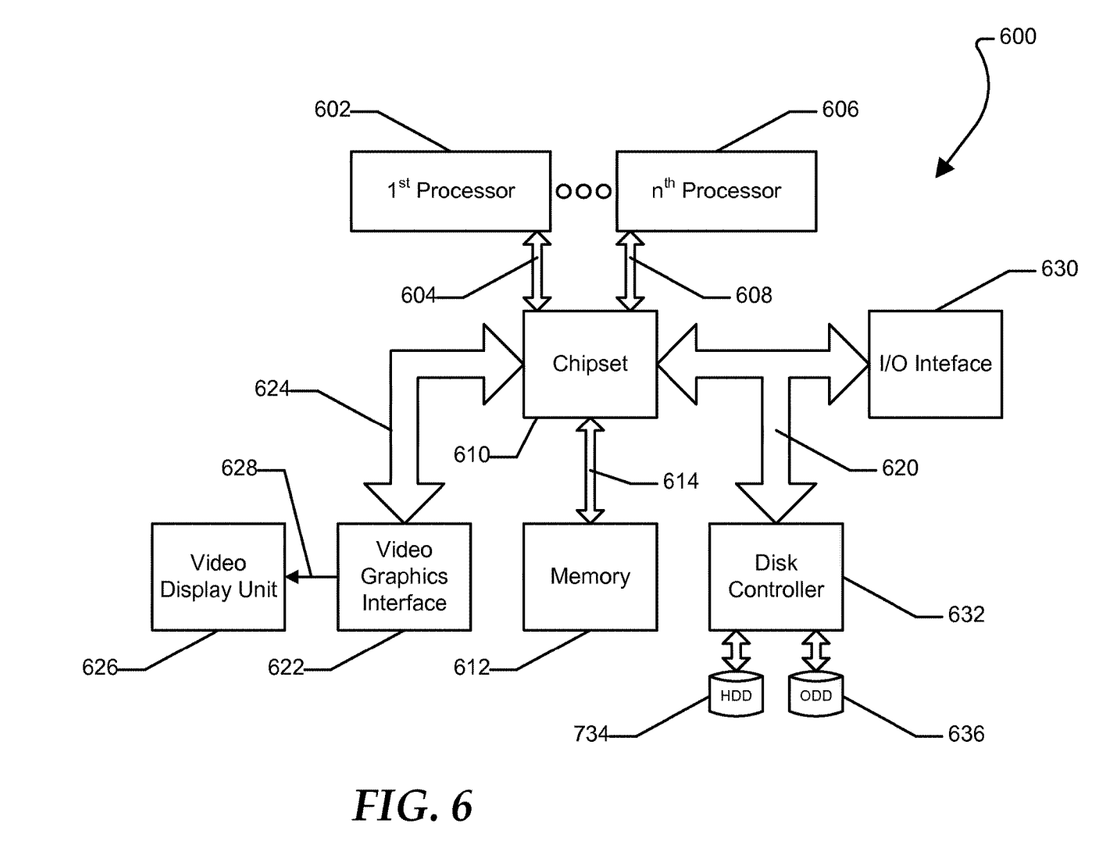
FIG. 6 is a block diagram of a general information handling system.

FIG. 6 illustrates a block diagram of a general information handling system, generally designated at 600. In one form, the information handling system 600 can be a computer system such as a server. As shown in FIG. 6, the information handling system 600 can include a first physical processor 602 coupled to a first host bus 604 and can further include additional processors generally designated as $n^{th}$ physical processor 606 coupled to a second host bus 608. The first physical processor 602 can be coupled to a chipset 610 via the first host bus 604. Further, the $n^{th}$ physical processor 606 can be coupled to the chipset 610 via the second host bus 608. The chipset 610 can support multiple processors and can allow for simultaneous processing of multiple processors and support the exchange of information within information handling system 600 during multiple processing operations.

According to one aspect, the chipset 610 can be referred to as a memory hub or a memory controller. For example, the chipset 610 can include an Accelerated Hub Architecture (AHA) that uses a dedicated bus to transfer data between first physical processor 602 and the $n^{th}$ physical processor 606. For example, the chipset 610, including an AHA enabled-chipset, can include a memory controller hub and an input/output (I/O) controller hub. As a memory controller hub, the chipset 610 can function to provide access to first physical processor 602 using first bus 604 and $n^{th}$ physical processor 606 using the second host bus 608. The chipset 610 can also provide a memory interface for accessing memory 612 using a memory bus 614. In a particular embodiment, the buses 604, 608, and 614 can be individual buses or part of the same bus. The chipset 610 can also provide bus control and can handle transfers between the buses 604, 608, and 614.

According to another aspect, the chipset 610 can be generally considered an application specific chipset that provides connectivity to various buses, and integrates other system functions. For example, the chipset 610 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 610. The chipset 610 can also be packaged as an application specific integrated circuit (ASIC).

The information handling system 600 can also include a video graphics interface 622 that can be coupled to the chipset 610 using a third host bus 624. In one form, the video graphics interface 622 can be an Accelerated Graphics Port (AGP) interface to display content within a video display unit 626. Other graphics interfaces may also be used. The video graphics interface 622 can provide a video display output 628 to the video display unit 626. The video display unit 626 can include one or more types of video displays such as a flat panel display (FPD) or other type of display device.

The information handling system 600 can also include an I/O interface 630 that can be connected via an I/O bus 620 to the chipset 610. The I/O interface 630 and I/O bus 620 can include industry standard buses or proprietary buses and respective interfaces or controllers. For example, the I/O bus 620 can also include a Peripheral Component Interconnect (PCI) bus or a high speed PCI-Express bus. In one embodiment, a PCI bus can be operated at approximately 66 MHz and a PCI-Express bus can be operated at approximately 628 MHz. PCI buses and PCI-Express buses can be provided to comply with industry standards for connecting and communicating between various PCI-enabled hardware devices. Other buses can also be provided in association with, or independent of, the I/O bus 620 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 610 can be a chipset employing a Northbridge/Southbridge chipset configuration (not illustrated). For example, a Northbridge portion of the chipset 610 can communicate with the first physical processor 602 and can control interaction with the memory 612, the I/O bus 620 that can be operable as a PCI bus, and activities for the video graphics interface 622. The Northbridge portion can also communicate with the first physical processor 602 using first bus 604 and the second bus 608 coupled to the n$^{th}$ physical processor 606. The chipset 610 can also include a Southbridge portion (not illustrated) of the chipset 610 and can handle I/O functions of the chipset 610. The Southbridge portion can manage the basic forms of I/O such as Universal Serial Bus (USB), serial I/O, audio outputs, Integrated Drive Electronics (IDE), and ISA I/O for the information handling system 600.

The information handling system 600 can further include a disk controller 632 coupled to the I/O bus 620, and connecting one or more internal disk drives such as a hard disk drive (HDD) 634 and an optical disk drive (ODD) 636 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. For example, the methods described in the present disclosure can be stored as instructions in a computer readable medium to cause a processor, such as chipset 610, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A chassis management controller comprising:
   a root file system including a plurality of directories associated with firmware applications of the chassis management controller;
   a shared memory to store a table that includes parameters of the directories in the root file system; and
   a daemon process module to communicate with the root file system and with the shared memory, the daemon process module to read the parameters of the directories, to create the table in the shared memory, wherein the table includes an entry for each of the parameters for the firmware applications, to register with an operating system kernel to receive any changes made within the directories, to enter into an idle mode after registering with the operating system kernel, to exit the idle mode in response to receiving a notification of a change in one of the directories of the root file system, and to update the table based on the change in the one of the directories.

2. The chassis management controller of claim 1 further comprising:
   an interposer library to communicate with the shared memory, the interposer library configured to intercept an input/output library call for an operation associated with one of the firmware applications, to determine whether the operation associated with the input/output library call would result in an over-allocation of a parameter in the entries of the table, and if the operation would not result in the over-allocation, pass the output operation to a standard system library, otherwise to return an out of space error message.

3. The chassis management controller of claim 1 further comprising:
   the operating system kernel in communication with the root file system, the operating system kernel configured to send the notification to the daemon process module in response to the change in one of the directories of the root file system.

4. The chassis management controller of claim 1 the daemon process module further to detect a new firmware application directory within the root file system, and to update the table to include the parameters for the new firmware application.

5. The chassis management controller of claim 1 wherein the parameters include a directory name, a maximum file size, and a total memory allocation for each of the firmware applications.

6. The chassis management controller of claim 1 wherein the table further includes an additional entry for the current size of each of the directories.

7. The chassis management controller of claim 1 wherein the shared memory is a secure digital memory card.

8. The chassis management controller of claim 1 wherein the operation is selected from a group consisting of storing a firmware update file, modifying a blade profile, and modifying a chassis configuration profile.

9. A chassis management controller comprising:
a root file system including a plurality of directories associated with firmware applications of the chassis management controller;
a shared memory to store a table that includes parameters of the directories in the root file system;
a daemon process module to communicate with the root file system and with the shared memory, the daemon process module to read the parameters of the directories, to create the table in the shared memory, wherein the table includes an entry for each of the parameters for the firmware applications, to register with an operating system kernel to receive any changes made within the directories, to enter into an idle mode after registering with the operating system kernel, to exit the idle mode in response to receiving a notification of a change in one of the directories of the root file system, and to update the table based on the change in the one of the directories; and
an interposer library to communicate with the shared memory, the interposer library configured to intercept an input/output library call for an operation associated with one of the firmware applications, to read table entries associated with the one of the firmware applications to determine a parameter for the one of the firmware applications, to determine whether the operation associated with the input/output library call would result in an over-allocation of the parameter read from the entries of the table, and if the operation would not result in the over-allocation then pass the output operation to a standard system library, otherwise to return an out of space error message.

10. The chassis management controller of claim 9 further comprising:
the operating system kernel in communication with the root file system, the operating system kernel configured to send a notification to the daemon process module in response to a change in one of the directories of the root file system, the daemon process module to exit the idle mode in response to the notification.

11. The chassis management controller of claim 10 wherein the daemon process module is further configured to detect a new firmware application directory within the root file system, and to update the table to include the parameters for the new firmware application.

12. The chassis management controller of claim 9 wherein the parameters include a directory name, a maximum file size, and a total memory allocation for each of the firmware applications.

13. The chassis management controller of claim 9 wherein the table further includes an additional entry for the current size of each of the directories.

14. The chassis management controller of claim 9 wherein the shared memory is a secure digital memory card.

15. The chassis management controller of claim 9 wherein the operation is selected from a group consisting of storing a firmware update file, modifying a blade profile, and modifying a chassis configuration profile.

16. A chassis management controller comprising:
a root file system including a plurality of directories associated with firmware applications of the chassis management controller;
a shared memory configured to store a table that includes parameters of the directories in the root file system;
a daemon process module to communicate with the root file system and with the shared memory, the daemon process module configured to read the parameters of the directories, and to create the table in the shared memory, wherein the table includes an entry for each of the parameters for the firmware applications, to exit an idle mode in response to receiving a notification of a change in one of the directories of the root file system, and to update the table based on the change in the one of the directories; and
an interposer library to communicate with the shared memory, the interposer library configured to intercept an input/output library call for an operation associated with one of the firmware applications, to read table entries associated with the one of the firmware applications to determine a parameter for the one of the firmware applications, to determine whether the operation associated with the input/output library call would result in an over-allocation of the parameter read from the entries of the table, and if the operation would not result in the over-allocation then pass the output operation to a standard system library, otherwise to return an out of space error message.

17. The chassis management controller of claim 16 further comprising:
an operating system kernel in communication with the root file system, the operating system kernel configured to send a notification to the daemon process module in response to a change in one of the directories of the root file system.

18. The chassis management controller of claim 17 wherein the daemon process module is further configured to register with the operating system kernel to receive the notification in response to any changes made within the directories, and to enter a idle mode upon completion of creating the table in the shared memory, to exit the idle mode in response to receiving the notification from the operating system kernel, and to update the table based on the change in the one of the directories.

19. The chassis management controller of claim 18 wherein the daemon process module is further configured to detect a new firmware application directory within the root file system, and to update the table to include the parameters for the new firmware application.

* * * * *